June 30, 1953  R. D. PIKE  2,643,937
METHOD OF MAKING NITRIC OXIDE
Filed Nov. 19, 1947  2 Sheets-Sheet 1
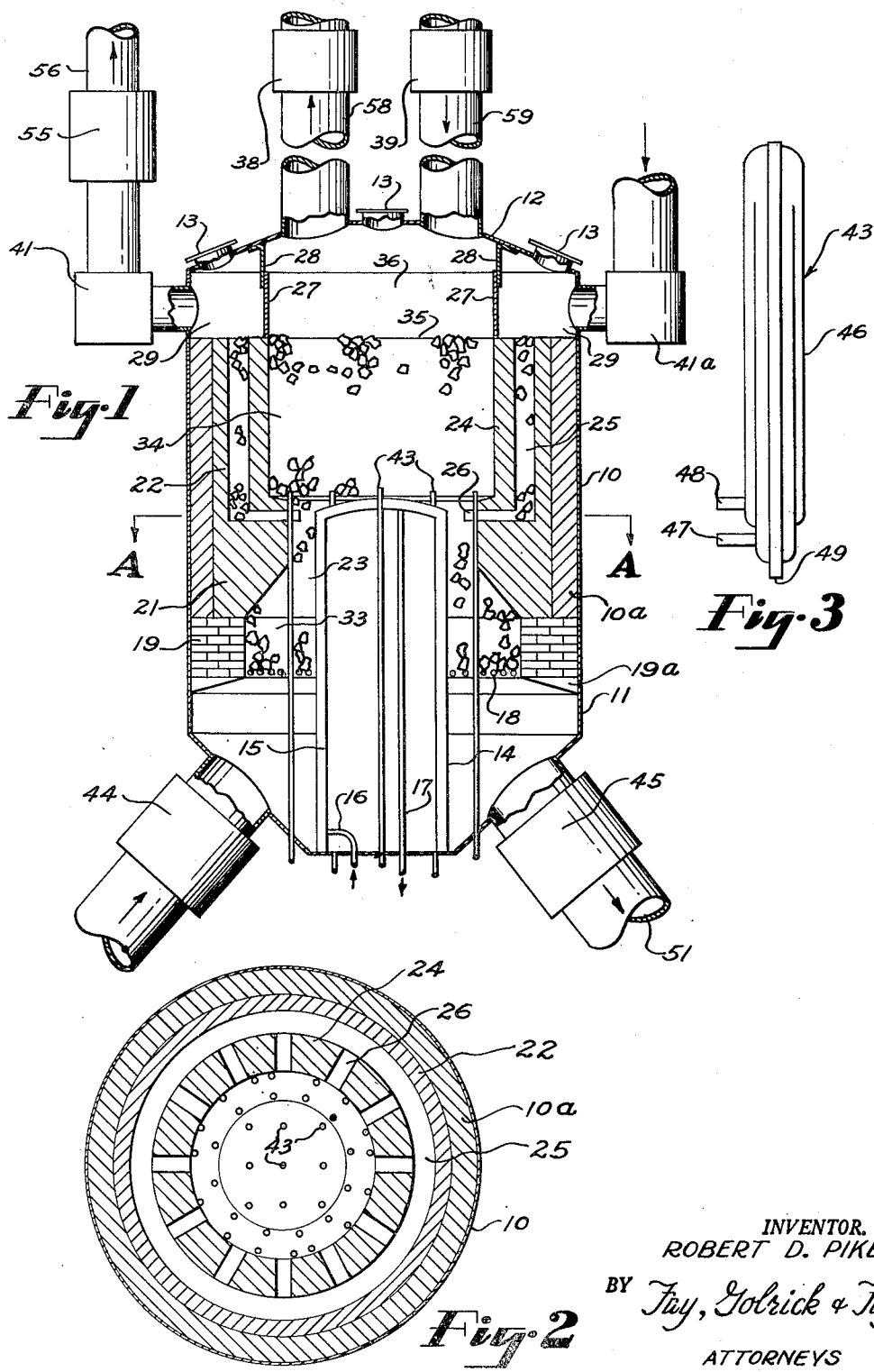
INVENTOR.
ROBERT D. PIKE
BY Fay, Golrick & Fay
ATTORNEYS June 30, 1953  R. D. PIKE  2,643,937
METHOD OF MAKING NITRIC OXIDE
Filed Nov. 19, 1947  2 Sheets-Sheet 2

INVENTOR.
ROBERT D. PIKE
BY Fay, Golrick & Fay
ATTORNEYS

Patented June 30, 1953

2,643,937

UNITED STATES PATENT OFFICE 2,643,937

METHOD OF MAKING NITRIC OXIDE

Robert D. Pike, Greenwich, Conn.

Application November 19, 1947, Serial No. 786,972

13 Claims. (Cl. 23—163)

This invention relates to an improved process and apparatus for the manufacture of nitric oxide (NO) by the reaction of nitrogen and oxygen at high temperature in fuel fired furnaces.

Previous attempts to produce nitric oxide in fuel fired furnaces have been characterized by the use of symmetrical cycles of substantial uniformity in the heating and cooling of the gases flowing through the furnaces and by the use of refractory particles of small diameter whereby the hot nitric oxide containing gases are cooled by the transfer of heat from the gases to the solid refractory particles in channels of small mean hydraulic radius.

I have found that better yields and better furnace operation can be secured by a completely non-symmetrical operation of the furnaces in which certain portions of the furnace are cooled and other portions heated in one portion of the cycle and nitric oxide produced in another and different portion of the cycle, as hereinafter described, and by cooling the hot nitric oxide containing gases by transfer of heat from a gas to a gas and thence to the solid refractory particles whereby larger refractory particles of substantially the same size may be used throughout the furnaces with less complications in the operation of the furnace, less resistance to gas flow through the furnace and less danger of clogging of the passages through the refractory particles in the furnaces.

One of the objects of my invention is to provide a method and apparatus in which the high temperature necessary to bring about the reaction of nitrogen and oxygen to produce nitric oxide may be maintained without destructive effect on the furnace walls or the refractory particles with which the furnace is filled.

Another object of my invention is to provide a method and apparatus in which the nitric oxide formed may be quickly cooled to below its disassociation temperature without disturbing the heat balance of the furnace.

Another object of my invention is to provide a method and apparatus for the production of nitric oxide in which as compared with previous practice a higher concentration of NO can be provided, symmetrical operation of the furnaces is unnecessary and larger refractory particles of substantially the same size throughout the furnace may be used.

Various other objects and advantages of my invention will be apparent as this description proceeds.

In the fixing and collecting of nitrogen from the atmosphere or from a gaseous mixture of nitrogen and oxygen by direct combination of these two gases at high temperature according to my invention, the necessary nitric oxide forming temperature is obtained by first passing a combustible mixture through a bed of refractory particles which are heated by such combustible mixture to the high temperature required, then passing the stream of atmospheric air or the gaseous mixture of nitrogen and oxygen through said bed in order to raise the temperature of the gaseous mixture to that required for the formation of nitric oxide in substantial amount and then simultaneously and almost immediately chilling such gaseous mixture by turbulently mixing therewith a stream of gas containing nitric oxide, but at a much lower temperature, and accelerating the turbulence, the mixing and the chilling by causing such mixture of high temperature and lower temperature streams of gaseous mixture to flow through a restricted and impeded chamber, which greatly accelerates the velocity of flow and of mixing.

I preferably employ two separately operated furnaces, of which in any one cycle one is making and chilling nitric oxide and the other is being heated to prepare it for the next cycle. It will be apparent, however, that the furnaces hereinafter described may be used singly or in multiples of two or more.

My invention includes novel means of preserving the refractories of the furnace lining whereby the intense nitric oxide forming temperature is maintained in and confined to the central portion of the furnace, the temperature prevailing immediately around the combustion and reaction zone being much lower because of the construction and method of operation of my furnace.

In the operation of my process and apparatus, I pass a stream of gas containing oxygen and nitrogen, preferably in equimolal proportions, through the reaction chamber of a furnace which has been heated to a temperature in excess of 4000° F. and preferably to as high as 4577° F. depending upon the resistance of the refractories available to form nitric oxide. At the same time I pass, preferably through an annulus surrounding the reaction chamber of the furnace, a recycled portion of nitric oxide containing gas previously produced containing preferably the same concentration of nitric oxide thus heating this gas regeneratively to a temperature somewhat in excess of 2000° F. and bring the two flows of nitric oxide containing gas together with great turbulence in a shock chilling annulus of the furnace of severely restricted cross sectional area, whereby a temperature of 3400 to 3600° F. or even lower is reached almost instantaneously, thus preserving most of the nitric oxide formed in the furnace.

The chilled mixture is then passed through the remainder of the furnace and discharged at an average temperature of about 500° F. whereby the refractory particles in the lower regenerative annulus of the furnace are heated preparatory to the next operation. It will be understood that I prefer to maintain as high a temperature in the combustion and reaction zone of the furnace as may be permitted by the available refractory material. This is because it is economical to operate the furnace at as high a concentration of nitric oxide as possible, other things being equal.

With an equimolal mixture of nitrogen and oxygen at 4577° F. the concentration of nitric oxide in the furnace discharge gases will be about 4.6% while at 4000° F. it will be about 2.8%.

In the heating of my furnace, I prefer to pass air upstream so that the air becomes heated by the particles in the lower regenerative annulus and shock chilling annulus of my furnace to about 2700° F. and then remove about one-half of this preheated air and pass it up through the annulus surrounding the furnace combustion zones, thereby regeneratively heating the particles in this surrounding annulus. The balance of the air is used for combustion with gaseous fuel in the combustion zone of the furnace using only that amount of excess air necessary to obtain the desired nitric oxide forming temperature, the gases of combustion substantially free of nitric oxide being finally wasted to the stack.

The furnace is filled throughout with uniformly graded particles 2" to 3" in size, or even larger, of a suitable refractory. This may be pure magnesium oxide or zirconium oxide, $ZrO_2$, or any other suitable refractory. The use of uniformly sized particles throughout the entire furnace enables the charge of these particles to be maintained by merely adding new lots of particles as needed through work doors in the top of the furnace.

By the use of large particles of substantially the same size throughout the furnace and replacing loss and shrinkage merely by addition through work doors at the top, I provide a furnace which can be maintained in operation for a long period with a minimum drop in pressure in the flow of gas through the furnace and a minimum danger of clogging. Also in former furnaces, including my application Serial No. 522,044, filed February 12, 1944, strict lines of demarkation were necessarily provided by layers of macadam between beds of particles of widely differing sizes. It has been found in practice that these lines of demarkation cannot be maintained at their originally constructed levels in the furnace, but subside because of shrinkage of the bed under the influence of the prevailing high temperatures. This has hereto proved to be an insurmountable difficulty, which I have completely overcome by the use of a bed of large particles uniformly graded throughout the furnace.

It is important to burn fuel in the heating portion of the furnace cycle with not more than about 15% surplus air over the theoretical requirements of combustion. In this way I attain a theoretical temperature of combustion after allowing for dissociation of $H_2O$ and $CO_2$ of about 4600° F., or as close to this as the refractory particles will stand in practice while the small percentage of free oxygen in the upstream gases of combustion amounting to not over about 2.5% results in the formation of only minor amounts of nitric oxide, and the large particles of the bed in the combustion zone do not cause chilling at a fast enough rate to prevent decomposition of any nitric oxide formed. I therefore recover nitric oxide only during the forming portion of the furnace cycle (or when the gas flow is in the opposite direction to the flow of the fuel).

In former processes in order to make commercial concentrations of NO in the gas of combustion, it has been necessary to maintain not less than about 12% by volume $O_2$, preferably higher, remaining after burning the fuel. This required about 147% surplus air over the requirements of combustion. This is in contrast to not over 15% in my present process. Furthermore, when using 147% surplus air, all of the air for combustion must be preheated to about 3700° F. to maintain a theoretical flame temperature of about 4600° F. after allowing for dissociation of $CO_2$ and $H_2O$. But I use only 15% surplus air in my present process, and it suffices to preheat the air to only about 2700° F. to maintain the same theoretical flame temperature of 4600° F.

I augment the chilling effect in the shock chilling annulus by forcing through the particles therein on the upstream or heating portion of the cycle almost twice the amount of air required for combustion. The use of this large amount of air on upstream together with the cooling effect of the water cooled burners and central drum, hereinafter described, restrict the maximum temperature of the upstream air to about 2700° F. This is necessary in order to maintain the desired rate of chilling in the nitric oxide forming cycle, and is also sufficient to achieve a temperature of combustion of about 4600° F. This temperature may, however, be as low as 4000° F., and still yield a concentration of nitric oxide of commercial value.

I also use three shock chilling effects in a shock chilling annulus of severely restricted cross-sectional area, filled with the same uniformly size refractory particles, a turbulent mixing of nitric oxide containing gas from the reaction zone of the furnace at its maximum temperature with recycled gas of same composition but at a lower temperature in the bed of refractory particles, b, transfer of heat from the nitric oxide containing gases to the particles at high velocity, c, abstracting sufficient heat from the region of the shock chilling annulus by water cooled surfaces of said burner pipes and central drum, to maintain the necessary heat balance required for shock chilling and combustion.

I also prefer to use as the refractory particles magnesia, zirconia, or other suitable refractory of high density and substantially free of iron. In this way I overcome, to a great extent, the deleterious catalytic effect of $Fe_2O_3$ in promoting dissociation of nitric oxide.

In the accompanying drawings which illustrate a preferred form of embodiment of my invention:

Figure 1 is a vertical cross-sectional elevation of one of my preferred furnaces;

Figure 2 is a cross-section on the line AA, Figure 1;

Figure 3 is a detail of a fuel gas burner; and

Figure 4:
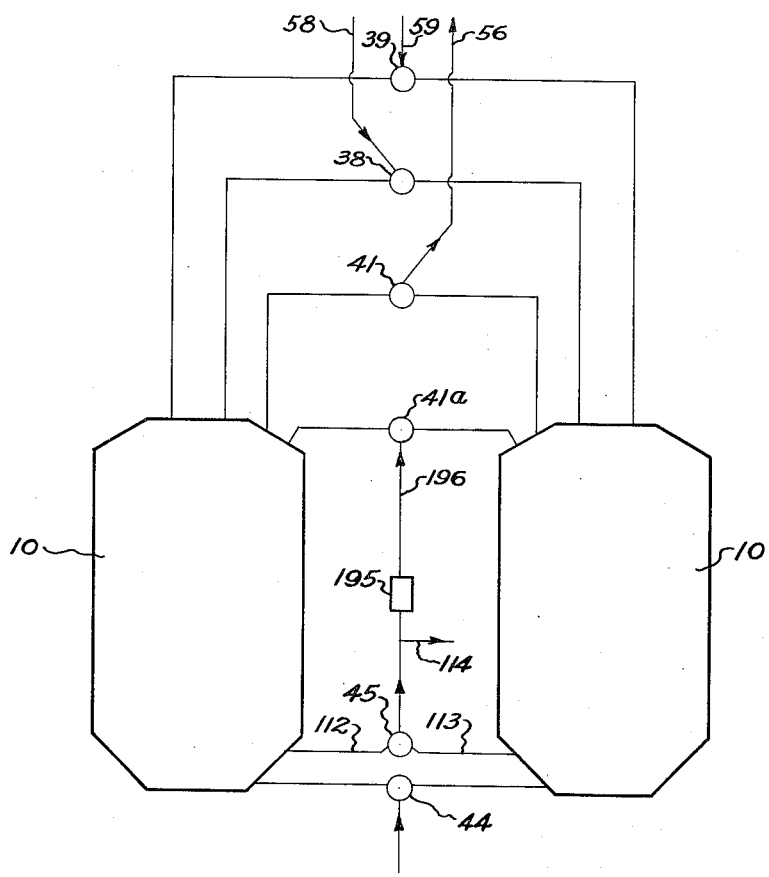
Figure 4 is a diagrammatic view of a pair of furnaces and the connection therebetween.

In the drawings Figure 1 illustrates a cylindrical vertically disposed airtight steel furnace shell 10, terminating in a frustrum of a cone 11, at the bottom and a domed top 12. Covered work hole doors 13, are provided top and bottom. Centrally disposed within the lower part of the shell is a closed cylindrical drum 14, which is made with annular water cooled walls 15 and is preferably mounted in the base 11 so as to be readily removable therefrom. Cooling water under pressure is supplied by pipes 16, and flows out through pipes 17. A water cooled removable grate 18 is installed at a level just above the conical bottom 11, and this grate supports the entire charge of refractory particles within the furnace. It can be removed and the particles allowed to drop, whence they can be removed through lower doors not shown and when the grate is replaced the furnace can be refilled through the upper work doors 13.

The lower part of the shell 10 is lined with firebrick 19 supported from the ledge 19a, and above this lining the shell is lined with a suitable type of basic refractory insulating lining 10a. Inside of this is the shaped lining 21, which forms the outer boundary of the shock chilling annulus 23. This lining is preferably of high grade magnesia brick. The lining 22 is preferably also of high grade magnesia brick. Inside and spaced from the lining 22 is an annular wall 24 of suitable thickness according to the size of the furnace and made of the best grade of refractory obtainable which may be high grade magnesia or may be ZrO2 or other refractory. The wall 24 forms the lining of the furnace proper, the lower part of which is the combustion and reaction zones. Between the wall 24 and the lining 22 is the annulus 25 which connects at bottom with the radial ports 26, which in turn connect with the top of the shock chilling annulus 23. The annulus 25 is open at the top. A steel partition 27 is attached to the wall 24 at its top and is in contact with a circular plate 28 through an expansion joint. The plate 28 is attached to the furnace top 12. The partitions 27 and 28, together with the furnace top 12 and wall 10, form the outer annular furnace flue 29.

The restricted annular space 23, which provides the shock chilling annulus, is bounded on its inner face by water cooled drum 14, and on its outer face by the shaped lining 21. The enlarged annular space 33 occupies the lower part of the furnace above the grates 18, and provides a lower regenerative annulus. The reaction chamber of the furnace is the space 34 above the shock chilling annulus 23 and the top of drum 14. The upper part of space 34 serves as the regenerative zone and the lower part as the combustion and reaction zone.

The lower regenerative annulus 33, the shock chilling annulus 23, the annulus 25 and the reaction chamber 34 are all filled to the level 35, with uniformly graded particles 2″ to 3″ in size, or even somewhat larger, of dense magnesia, zirconia, or other suitable refractory, which should preferably be substantially free from iron. Above the level 35, in the furnace proper, is the space 36, which connects with the stack through a flue having the three-way valve 38 for removing gases of combustion on the upstream or heating part of the cycle and a flue having a three-way valve 39, for introducing the mixture of nitrogen and oxygen on the downstream or forming part of the cycle.

On the upstream or heating portion of the cycle, the flue having the three-way valve 41, removes air from the annular space 29 by means of the exhaust fan 55 which discharges to the stack 56. This fan is used to control the amount of air withdrawn. On the downstream or forming part of the cycle, the three-way valve 41a delivers cold nitric oxide containing gas, preferably recycled from another part of the process, to annular space 29, whence it flows down through the furnace annulus 25, and through the radial ports 26 into the shock chilling annulus. As the recycled NO containing gas entering the top of the furnace annulus, 25, on forming cycle is cold; i. e., preferably at about 100° F. and emerges through the radial ports 26, inwardly at about 2300° F. and passes through these ports outwardly on combustion cycle at about 2700° F. and leaves the top of the annulus, 25, on its way to the stack, at about 500° F. the prevailing average temperature in the furnace annulus is low, being about 2500° F. at the bottom and about 300° F. at the top. This causes a considerable flow of heat outwardly through the annular brick wall, 24, from the regions of very high temperature, within the furnace proper. This flow of heat is of vital and critical importance in preserving the brick work of the annular wall, 24.

I provide preferably thirty-seven water cooled fuel gas burners 43 for a furnace with a chamber 34 which is 12′ in diameter, although the number of burners will vary with the size of the furnace, the fuel, heat requirements, etc. Preferably nine of these extend upwardly through the drum 14 and terminate just above its upper surface. The remaining twenty-eight extend upwardly through the shock chilling annulus 23 to the same level.

The outer pipe 46 of burners 43, Figure 3, is preferably made of stainless steel. Fuel gas flows through central pipe 49. Cooling water enters at 47 and flows out through 48.

The three-way valve 44 admits air on the upstream or heating portion of the cycle. About one-half of this air passes through the ports 26 and up through the particles in the furnace annulus 25, thence out through the three-way valve 41 and the exhaust fan 55 to the stack 56.

On the downstream or forming portion of the cycle the nitric oxide containing gas passes through three-way valve 45 at an average temperature of about 500° F. At this point (see Figure 4) a part of the gas is removed and passed through a cooler 195 and thence delivered to the three-way valve 41a. The remainder or net flow of the nitric oxide containing gas goes to a suitable collecting system where the nitric oxide is removed and the stripped gas if it contains an excess of oxygen is eventually returned to three-way valve 39.

The furnaces of my invention can be operated on either an equimolal mixture of oxygen and nitrogen or by supplying atmospheric air on downstream to valve 39, at some expense of concentration of nitric oxide. If an equimolal mixture of oxygen and nitrogen is used a 4.6% concentration of nitric oxide can be secured under certain operating conditions hereinafter specified, but if under the same conditions atmospheric air is used the concentration of nitric oxide would be reduced to about 2.9%. If air is used, recycling of the gas from the collecting system to the furnaces is unnecessary.

Figure 4 illustrates the connections between two furnaces 10 of similar construction. As illustrated in this embodiment the three-way valve 41 is arranged so as to connect the chamber 29 of either furnace with the stack 56 through the exhaust fan 55. The valve 41a is connected to receive cooled nitric oxide from the cooler 195 and line 196 and direct it into the chamber 29 and through the annulus 25 and ports 26 of either furnace.

The three-way valve 38 is arranged so as to direct the gases from the up cycle of each furnace to the stack to waste, and the three-way valve 39 is connected to receive either an equimolal mixture of nitrogen and oxygen or air and direct it into the reaction chamber 34 of either furnace.

The valve 45 is connected so as to receive the nitric oxide containing gases from either furnace and direct them to the recovery system to which the line 114 is connected, a portion of these nitric oxide containing gases being passed through the cooler 195 for recirculation to the chilling annulus as previously described.

Valve 44 is connected to direct a stream of air into either furnace.

There are two portions to the cycle of operation for each furnace: (1) Upstream heating of the furnace; and (2) downstream forming of nitrogen and oxygen into nitric oxide.

Referring to one furnace of a pair, on upstream heating valve 44 is open, valve 45 is shut; valve 41 is open and exhaust fan 55 is regulated to draw the desired amount of air through annulus 25. Valve 41a is shut, valve 38 is open and valve 39 is closed.

On downstream forming, three-way valve 41a delivers recycled nitric oxide containing gas to chamber 29. Valve 38 is closed and valve 39 is open. Valve 44 is closed and valve 45 is open.

In the operation of a furnace with a diameter inside the chamber 34 of 12′, the inside diameter of the furnace lining 22 which bounds the furnace proper will be 17′ 11″. The outside diameter of the furnace will be 22′ 5½″. The outside diameter of the shock chilling annulus 23 will be 10′ 3½″. The furnace will have an overall height to the spring of the dome on the top of 29′ 7″, and the furnace chamber 34 will be 8′ deep. The shock chilling annulus 23 will be 3′ 4″ deep and the lower regenerative annulus 33 will have a depth of 6′. There are preferably 12 of the ports 26, each port having a circumferential dimension of 9″ and a height of not less than 5″ but this height may be as much as 10″ in order to compensate for the obstruction of the refractory particles which partly occupy these ports at each end. The gas issuing through the ports 26 inwardly radially on downstream enters the main stream of gas at right angles at a velocity of about 200 feet per second.

In a furnace of this size on the upstream or heating portion of the cycle, I introduce about 17,500 C. F. M. air at about 2.52 p. s. i. ga. and atmospheric temperature through valve 44. This flow may be maintained for eight minutes. During this period I supply approximately 870 S. C. F. M. fuel gas figured as methane through the burners 43. I continuously supply cooling water to the burners 43 and to the annular wall of the drum 14, preferably under a pressure of about 300 p. s. i. ga. and at the rate of about 168 G. P. M.

The air passing up through the lower regenerative zone 33 and shock chilling annulus 23 is heated on the average to about 2700° F. Of the total air supplied about 48% passes outwardly through the ports 26 and upwardly through furnace annulus 25 and out to the stack 56, and the balance is used to support combustion of the fuel in the lower part of the chamber 34 in amount of not more than about 15% excess over the theoretical requirements of combustion. The theoretical flame temperature with 15% surplus air adjusted for dissociation of water and carbon dioxide is about 4600° F., which allows a satisfactory thermal head over the desired reaction temperature of 4577° F. If it is desired to operate at a lower temperature, the amount of fuel may be reduced accordingly. The bed of particles in chamber 34 of the furnace during the preceding downstream flow has had its level of maximum temperature forced downwardly to about 2 feet above the tips of the burners, and during eight minutes of upstream combustion the level of maximum temperature is raised slightly above this. By confining the zone of intense heat to the lower portion of chamber 34, which is surrounded by the annulus 25, the walls of the roof of the furnace are protected or shrouded from the intense heat and therefore have a longer life. By the use of only a slight excess of air over the theoretical requirements of combustion not exceeding about 15%, localized overheating of the refractory particles in the lower portion of chamber 34 is prevented and the life of the particles prolonged. This is because necessarily the fuel gas and the air for combustion do not mix instantaneously, but create spaces near the burner tips where the mixture is of fuel gas with the air which is theoretically required for combustion. This is true of my present invention, as well as of prior processes. If the air for combustion is at about 3700° F., as it must be when the surplus air is about 147%, as in prior processes, the spaces in which the air and gas are mixed in theoretical proportions for combustion are so intensely hot as to destroy any known refractory material. On the other hand, in my present process in which the air for combustion is at only 2700° F., the temperature in the spaces where the theoretical mixtures of fuel gas and air occur is scarcely more than the prevailing temperature in the combustion zone and not high enough to injure the refractory particles.

During upstream heating the air going to the stack 56 through the reversing valve 41, is about 18,200 C. F. M., and the gases of combustion going to the stack through valve 38 are about 21,000 C. F. M., both at 500° F. which is about the average temperature.

On downstream flow about 15,500 C. F. M. of preferably an equimolal mixture of nitrogen and oxygen is introduced at about 2.52 p. s. i. gauge and about 330° F. through valve 39. The recycled nitric oxide containing gas introduced through the three-way valve 41a to the furnace at about 2.60 p. s. i. and 100° F. gauge is 8650 C. F. M. The furnace discharge gas containing 4.6% nitric oxide, or less if operated below 4577° F., amounts to about 39,600 C. F. M. at 500° F., which is about the average temperature of exit.

The total nitric oxide containing gas which is recirculated through the furnace annulus 25 is about 80% of the net flow through the furnace proper on downstream and it enters through the ports 26, at about 2300° F.

Two furnaces of the dimensions described when operated as indicated will produce about 14.7 tons nitrogen as nitric oxide in the furnace exit gas in 24 hours when the gas contains 4.6% nitric oxide.

As pointed out above, the furnaces, when fed on downstream forming with an equimolal mixture of nitrogen and oxygen, must be operated in closed cycle with a collecting system so that the unused oxygen may be recirculated. The circulation of gas must be bled to the extent of about 5%, the bled portion being discarded to keep down the concentration of the rare gases of the atmosphere, mostly argon. When a 5% bleed is withdrawn, the argon concentration of the remaining circulation will build up to a steady concentration of about 6.5%.

Pure oxygen, or 95% oxygen, is consumed in three ways in the closed cycle: (1) by combination of nitrogen and oxygen forming NO; (2) by loss through bleed, and (3) by oxidation of nitric oxide to form nitrogen peroxide in the collecting system, which must be done completely to render the collection feasible. The first two losses of oxygen can be made up by supplying a mixture of equal volumes of nitrogen and oxygen which can be made by mixing air and 95% commercial oxygen. In such a mix 74.8% of the total oxygen is added as the 95% commercial grade. The third can only be made up by adding pure oxygen, but in practice the 95% grade is acceptable. The net consumption of 95% oxygen is about 3.1 lbs. per lb. nitrogen fixed in the furnace discharge gas amounting in the illustration given above to about 62.5 lbs. per minute or 702 S. C. F. M. The make-up air amounts to 54.8 lbs. per minute or 680 S. C. F. M This air when operating on closed cycle may advantageously be introduced into the circulation by blowing it through the fuel pipes of the burners not in use, because its rate of flow is almost as great as that of the fuel gas itself These figures are based upon 4.6% nitric oxide in the furnace discharge gas.

Since the cycle during formation of nitric oxide is entirely closed and is separated from the cycle during which fuel is burned, the forming cycle can be maintained in an anhydrous condition by removing moisture from any make-up air and oxygen. The advantages of such a cycle are of course evident since any moisture which is produced in the forming cycle has to be removed from the products of the forming cycle along with the nitric oxide and places an added burden upon whatever recovery system is employed to remove the nitric oxide from the entire gaseous mixture.

In the range of operating temperatures mentioned, namely, 4577° F. to 4000° F. and whether using air in the furnace proper, or an equimolal mixture of nitrogen and oxygen, the mass velocity in the furnace proper is preferably 100 S. C. F. M. (standard cu. ft. per min. at 32° F. and sea level) per square foot of cross-sectional area of the furnace After allowing for overblow and the recycled nitric oxide containing gas as well as the different area of cross-section, the following rates of flow expressed as S. C. F. M. per sq. ft. pertain to the different parts of the furnace of the size given above.

Up and downstream in furnace annulus____ 100
Downstream in shock chilling annulus____ 470
Upstream in shock chilling annulus_____ 440
Downstream in lower regenerative zone_____ 115
Same upstream _____ 105
Upstream in furnace proper_____ 92

The downstream and upstream operations of the furnace of my present invention are totally dissimilar from each other. The purpose of the upstream operation is primarily to restore the reaction temperature to the particles in the furnace proper. This is done by burning fuel with a relatively low surplus of air for combustion— about 15%—at a relatively low temperature, namely, about 2700° F. Under these conditions the flame temperature after allowing for dissociation is about 4600° F., which is sufficiently high for forming over 5% nitric oxide in an equimolal mix of oxygen and nitrogen. In passing through about 2 feet of the particles in the lower part of the chamber 34 above the burner tips, about 90% of equilibrium value of nitric oxide will be formed. But as the oxygen concentration in the gas of combustion is not more than about 2.5%, but little nitric oxide is formed and because the particles with which the furnace is filled are 2″ to 3″ in size, or even larger, there will be practically no shock chilling effect on the upstream or heating cycle and therefore of the little nitric oxide formed, practically none will be preserved. The absence of nitric oxide in the gas of combustion is an important feature of my invention, because its presence even in relatively small amounts will necessitate costly collection because of the danger of discharging it into the atmosphere.

The upstream air entering the bottom of the furnace at atmospheric temperature and about 2.5 p. s. i. ga. is regeneratively heated by the particles in the lower regenerative annulus 33 and shock chilling annulus 23 to about 2700° F. Almost half of this air is diverted to flow up through the furnace annulus 25, and the balance of the air flows through the chamber 34 furnishing the air for combustion of the gaseous fuel from the gas burners.

On downflow air, or the mixture of nitrogen and oxygen, is passed down through the particles in the chamber 34 and becomes heated to nitric oxide forming temperature and thence enters the severely restricted shock chilling annulus 23. A part of the furnace discharge gas amounting to about 44% of the total is preferably recycled after cooling to about 100° F. back to the top of the furnace annulus 25 where it flows down through the particles with which this annulus is filled and thence inwardly at high velocity through a number of radial ports 26, at the level of the top of the shock chilling annulus 23. The nitric oxide containing gas issuing from ports 26 at high velocity of about 200 feet per second and at a temperature of about 2300° F. meets the new nitric oxide containing gas from the chamber 34 at right angles; the latter gas is at a considerably higher temperature, and as these gases mingle with great turbulence in the interstices between the particles in the shock chilling zone, the reduction of temperature over the critical range of decomposition of nitric oxide is so rapid as to be almost instantaneous.

The gas mixture, now at 3400 to 3600° F. flows down through the shock chilling annulus 23 and the lower regenerative annulus 33 of the furnace, and thence out from the furnace at a mean temperature of about 500° F., thus completing the downstream portion of the cycle.

The downstream portion of the furnace cycle unlike the upstream portion which produces no nitric oxide, is designed to give the highest possible yield of nitric oxide which may result from the temperature of operation in the furnace proper and from the concentration of oxygen in the downstream gas. The total dissimilarity between the flow on forming and the flow on heating cycles is a novel feature of my present invention.

The shock chilling annulus and the lower regenerative annulus of the furnace combine the functions of a regenerative air heater on upstream when the flow of air comprising the air for combustion and overblow is heated to about 2700° F. with a shock chilling action on downstream. The temperature of about 2700° F., to which the air is heated on upstream is critical because if it becomes much lower than this, the temperature of combustion in the furnace proper will suffer serious reduction; and, if on the other hand it gets much higher, shock chilling efficiency will suffer. The temperature of 2700° F. for the air for combustion is associated with the highest level of operating temperature, namely, 4577° F. I have pointed out that operating temperatures as low as 4000° F. may be successfully used, and if this be the case, the temperature of the air for combustion may be somewhat lower. This in turn will increase the shock chilling effect and make the preservation of most of the nitric oxide formed in the furnace more easily accomplished.

The heat balance relations in the shock chilling annulus and lower regenerative annulus would result in a surplus of heat raising the general level of temperature, were it not for the heat abstracted by the water-cooled surfaces of the burner pipes 43 and central drum 14. These play a role in maintaining the temperature of the air for combustion at the desired level. They are in a sense the equivalent of the surplus air passed through the furnace annulus and if the water cooled drum 14, for example, were removed and replaced by refractory material, the equivalent cooling effect could be restored by a suitable increase in this air. The primary function of the water cooled drum 14 is to provide the inner boundary of the shock chilling annulus and the extraction of heat is the secondary or incidental function which could be exercised by an increase of the air through the furnace annulus.

While I have described the furnaces as operating on the upstream portion of the cycle to heat the furnace chamber and on the downstream portion to produce nitric oxide, it will be understood that they can be operated in different ways, and that the cycles can be reversed so that heating takes place on downflow and making of nitric oxide on upflow, and that various other modifications and changes can be made within the spirit of my invention and without departing from the scope of the appended claims.

I claim:

1. The method of producing nitric oxide from gaseous mixtures of nitrogen and oxygen, which comprises passing said mixture in one direction only through a bed of refractory particles of substantially uniformly graded size which have been heated to a high temperature at which nitrogen and oxygen react to form nitric oxide therein, and immediately thereafter cooling said highly heated gaseous reaction mixture by passing it into refractory particles in a second and cooler portion of said bed while simultaneously introducing into said reaction mixture at the place of its entrance and into the zone of its entrance into said cooler portion a substantial amount of a cooler gas containing nitric oxide thereby causing an intimate admixture of the cooler gas and the reacted gas and a shock chilling of the reacted gas by the conjoint additive action of the cooling gas and the chilling bed, recovering the nitric oxide so produced, and restoring the heat to said first named portion of said bed of refractory particles and cooling said second named portion of said bed of refractory particles by passing air through said bed in reverse direction to the previous flow of gases therethrough, passing more air through the second named portion of said bed of refractory particles than is passed through the first named portion of said bed of refractory particles, heating the first named portion of said bed of refractory particles by injecting a gaseous fuel thereinto and burning it therein supported by the air passed thereinto from said second portion, discarding the gases formed in said first named portion of said bed of refractory particles during the heating operation, passing the excess of air which flows through the second named portion of said bed through an annulus of refractory particles surrounding the first named portion of said bed, and passing chilling gas in reverse direction through said annulus and into the stream of highly heated gases during the nitric oxide forming reaction.

2. The method of claim 1 in which the said chilling gas contains recirculated nitric oxide formed in a previous cycle of said method.

3. In a method of heating a furnace for the formation of nitric oxide in a gaseous mixture containing nitrogen and oxygen to be passed therethrough, the steps which consist in causing a gaseous stream of air to flow through a furnace chamber provided with a circumferentially restricted portion adjacent one end and containing a bed of refractory fragments, introducing gaseous fuel at approximately the longitudinally central plane of said bed to produce a temperature at the longitudinal central zone thereof in excess of 4000° F. and a temperature at the exit end thereof of approximately 500° F., withdrawing a portion of the air passing through said bed at a point in advance of the introduction of gaseous fuel into said bed and circulating such withdrawn gas around the walls of the combustion portion of said furnace chamber and within a second encircling wall and then withdrawing such air from said furnace and also separately withdrawing the products of combustion from said furnace.

4. In the process for making nitric oxide from gas containing $N_2$ and $O_2$, the steps of passing the said gas through a main bed of refractory particles of substantially uniformly graded size previously heated to nitric oxide forming temperature and rapidly chilling said formed nitric oxide by continuing the flow through a continuation of said main bed at lower temperature, removing the nitric oxide containing gas, then reversing the flow, passing air in the excess of the requirements of combustion through said continuation of said main bed to cool the particles therein, removing air over the requirements for combustion before it enters the main bed of refractory particles, burning fuel with the balance of said air in said main bed of refractory particles in a ratio of fuel to air in which air is present only in sufficient amount to insure complete combustion but insufficient to supply a concentration of free $O_2$ to make an apreciable concentration of nitric oxide, and passing the gas of combustion on through the particles in the furnace and out of the main bed at reduced temperature and substantially barren of nitric oxide.

5. A process for making nitric oxide from gas containing $N_2$ and $O_2$, comprising the steps of passing a stream of said gas in one direction through a main bed of refractory particles in an enclosed pressure-tight reaction zone, whereby the said gas is first preheated to nitric oxide forming temperature and maintained at that temperature for sufficient time to arrive at a substantial equilibrium concentration of nitric oxide in a reacted gas, then turbulently mixing the reacted gas with a recycled nitric oxide containing gas at lower temperature at the juncture between the main bed and a continuation thereof of restricted cross-sectional area having a lower temperature to chill the reacted gas almost instantaneously to about 3400 to 3600° F., then passing the mixed gas through particles in another continuation of said bed of enlarged cross-sectional area to cool same to stack temperature, withdrawing nitric oxide; then passing a stream of air through the beds in opposite direction during a heating period, first through the last mentioned continuation bed of enlarged cross-sectional area, then through the first named continuation bed of restricted cross sectional area, then adding fuel for combustion in the main bed, whereby a nitric oxide forming temperature is reached, and then passing the gas of combustion through the bed and finally discharging it to the stack, substantially free of nitric oxide.

6. In a method of making nitric oxide from a gaseous mixture containing nitrogen and oxygen the steps which consist in passing a stream containing said mixture of nitrogen and oxygen into and through a bed of refractory particles having a temperature at the entrance and exit of said particles of approximately 500° F. and a temperature in approximately the central zone of said bed in excess of 4000° F., whereby said mixture of nitrogen and oxygen is caused to react to produce nitric oxide, blowing radially inward into said bed adjacent the zone of maximum temperature a series of streams of a gas at a temperature approximating 2300° F. and containing nitric oxide in a percentage substantially equal to the percentage of nitric oxide produced in the reacted mixture of nitrogen and oxygen, and causing said streams of gases to intermingle and flow through a circumferentially restricted passage in said bed of refractory particles and further cooling said streams of gases by causing them to flow through a further cooled portion of said bed.

7. In a method of continuously producing nitric oxide from gaseous mixtures of nitrogen and oxygen in two interconnected gas-tight furnaces simultaneously operated but with opposite flow through the two chambers, each furnace chamber being provided with a single bed of refractory particles of relatively large size and having an annular chamber surrounding the upper portion of each furnace with ports connecting said chambers with said furnace at a point intermediate the ends of the bed of refractory fragments in said chamber, the steps which consist in passing air and gaseous fuel upwardly through one of said furnace chambers and burning the gaseous fuel to heat the upper portion of the bed therein to a nitric oxide forming temperautre, but without the formation of any appreciable quantity of nitric oxide during the flow therethrough in the direction stated, withdrawing a portion of said air through refractory particles disposed in said annular chamber surrounding the upper portion of said furnace chamber, simultaneously causing a mixture of oxygen and nitrogen having sufficient oxygen therein to form a substantial quantity of nitric oxide when raised to nitric oxide forming temperature to flow downwardly through the refractory fragments forming the upper portion of the bed of the other of said furnaces, said last-named bed having had its upper portion raised to the nitric oxide forming temperature in a previous cycle, thereby forming a substantial amount of nitric oxide in the upper portion of said second furnace, then chilling the gas passing downwardly through said second furnace and fixing the nitric oxide therein produced by injecting a cool gas containing an amount of nitric oxide equal to that formed in the main gas stream through the annulus surrounding said chamber and through the ports connecting the annulus with said bed, which nitric oxide containing gas has been produced in a previous cycle, and withdrawing the intermingled gaseous mixture containing nitric oxide from the exit end of said bed in said second furnace.

8. In a method of continuously producing nitric oxide from gaseous mixtures of nitrogen and oxygen in two interconnected gas-tight furnaces simultaneously operated but with opposite flow through the two chambers, each furnace chamber being provided with a single bed of refractory particles of relatively large size and having ports in the walls of said two chambers at a point intermediate the ends of the bed of refractory particles in said chamber, the steps which consist in passing air and gaseous fuel through one of said furnace chambers and burning gaseous fuel therein to heat a portion of the bed therein to a nitric oxide forming temperature, but without the formation of any appreciable quantity of nitric oxide during the flow therethrough, withdrawing a portion of the air through said ports, simultaneously causing the mixture of oxygen and nitrogen having sufficient oxygen therein to form a substantial quantity of nitric oxide when raised to nitric oxide forming temperature to flow through the refractory fragments forming the bed of the other of said furnaces, said last-named bed having been raised to the nitric oxide forming temperature in a previous cycle, thereby forming a substantial amount of nitric oxide in said second furnace, then chilling the gas passing downwardly through said second furnace and fixing the nitric oxide therein produced by injecting a portion of a cool gas containing a percentage of nitric oxide equal to that formed in the main gas stream through said ports in the second of said chambers into the bed therein at a point intermediate its ends, which nitric oxide containing gas has been produced in a previous cycle, and withdrawing the intermingled gaseous mixture containing nitric oxide from the exit end of said bed in said second furnace.

9. In a method of continuously producing nitric oxide from gaseous mixtures of nitrogen and oxygen in a plurality of interconnected gas-tight furnaces simultaneously operated but with flow therethrough in different directions, each furnace chamber being provided with a single bed of refractory particles of relatively large size and having at a point intermediate the ends of the bed therein ports extending through the wall thereof and a fixed water-cooled chilling element therein, the steps which consist in passing air and gaseous fuel through one of said furnace chambers and burning the gaseous fuel therein to heat a portion of the bed to a nitric oxide forming temperature, but without the formation of any appreciable quantity of nitric oxide during the flow therethrough, simultaneously causing a mixture of oxygen and nitrogen having sufficient oxygen therein to form a substantial quantity of nitric oxide when raised to nitric oxide forming temperature to flow in the opposite direction through the refractory fragments forming the bed of another of said furnaces, said last-named bed having had a portion thereof raised to the nitric oxide forming temperature in a previous cycle, thereby forming a substantial amount of nitric oxide in the said portion of the bed of said second named furnace, and then chilling the nitric oxide containing gas passing through said second named furnace and fixing the ntiric oxide therein jointly by injecting a cool gas containing a percentage of nitric oxide equal to that formed in the main gas stream through said ports and by causing said mixture of gases to flow over said water-cooled chilling element, and withdrawing the intermingled gaseous mixture containing nitric oxide from the exit end of said bed in said second named furnace.

10. In a method of continuously producing nitric oxide from gaseous mixtures of nitrogen and oxygen in interconnected gas-tight furnaces simultaneously operated but with opposite flow through the chambers thereof, each furnace chamber being provided with a single bed of refractory particles of relatively large size and having an annular passage filled with refractory particles surrounding the upper portion of each furnace with ports connecting said annular passages with said furnace at a point intermediate the ends of the bed of refractory fragments in said furnace chamber, each of said chambers being also provided with a series of gas burners extending through a portion of the beds of refractory particles therein and terminating adjacent said ports and a water-cooled chilling element also extending into eacn of said beds of refractory particles and also terminating adjacent said ports, the steps which consist in passing air and gaseous fuel through one of said furnace chambers and injecting said gaseous fuel through said burners thereinto to heat a portion of the refractory bed therein to a nitric oxide forming temperature, but without the formation of any appreciable quantity of nitric oxide during the flow therethrough, withdrawing a portion of such heated air through the refractory particles disposed in said annular chamber surrounding the upper portion of said furnace, simultaneously causing a mixture of oxygen and nitrogen having sufficient oxygen therein to form a substantial quantity of nitric oxide when raised to nitric oxide forming temperature to flow through the refractory particles forming the bed of another of said furnaces, said last-named bed having had a portion thereof raised to the nitric oxide forming temperature in a previous cycle, thereby forming a substantial amount of nitric oxide in the said portion of said second named furnace and then chilling the gas passing through said second named furnace and fixing the nitric oxide therein by injecting a cool gas containing a percentage of nitric oxide equal to that formed in the main gas stream through the annular passage surrounding said portion of said chamber and through the ports connecting the annular passage with said bed, which nitric oxide containing gas has been produced in a previous cycle, and withdrawing the intermingled gaseous mixture containing nitric oxide from the exit end of said bed in said second named furnace.

11. The method of producing nitric oxide from gaseous mixtures of nitrogen and oxygen, which comprises passing said mixtures in one direction only through a bed of refractory particles of uniformly graded size wherein a portion of said bed has been heated to a high temperature at which nitrogen and oxygen react to form nitric oxide therein, and immediately thereafter cooling said highly heated reaction gas mixture by passing it into refractory particles in another and cooler portion of said bed while simultaneously introducing into said reaction mixture at the place of its entrance and into the zone of its entrance into said cooler portion a substantial amount of a cooler gas containing nitric oxide thereby causing an intimate admixture of the cooler gas and the reacted gas and a shock chilling of the reacted gas by the conjoint additive action of the cooler gas and the chilling bed, and recovering the nitric oxide so produced.

12. The method of producing nitric oxide from gaseous mixtures of nitrogen and oxygen in which nitric oxide is produced in a make bed of refractory particles of substantially uniformly graded size, heated to a high temperature at which nitrogen and oxygen react therein and chilled in a cooling bed of refractory particles, which comprises passing said gaseous mixture in one direction only through the make bed to form the nitric oxide reaction gas therein and then passing the reacted gas through an adjacent cooling bed of substantially the same graded size particles while simultaneously introducing into the reacted gas at the place of its entrance into said cooling bed a substantial amount of a cooler gas containing about the same quantity of nitrogen oxide as said reaction gas thereby causing an intimate admixture of the cooler gas and the reacted gas and a shock chilling of the reacted gas by the conjoint additive action of the cooler gas and the chilling bed, and restoring the heat to said make bed and cooling said cooling bed by injecting a fuel gas into said make bed and supporting its combustion therein by passing air thereinto from said cooling bed by first passing the air through said cooling bed in reverse direction to the previous flow of gases therethrough and in excess of the amount necessary to support the combustion of said fuel gas, discarding excess air, and discarding combustion gases formed during the heating operation.

13. The method of claim 12 in which the amount of air passed through the make bed during the heating thereof contains not more than 15% in excess of that required for combustion of said fuel gas.

ROBERT D. PIKE.

References Cited in the file of this patent

UNITED STATES PATENTS

| Number | Name | Date |
|---|---|---|
| 777,485 | Pauling | Dec. 13, 1904 |
| 882,958 | Pauling | Mar. 24, 1908 |
| 1,283,112 | Drawe | Oct. 29, 1918 |
| 1,466,604 | Springmann | Aug. 28, 1923 |
| 2,121,733 | Cottrell | June 21, 1938 |
| 2,408,282 | Wolf | Sept. 24, 1946 |
| 2,421,744 | Daniels et al. | June 10, 1947 |
| 2,422,081 | Cottrell | June 10, 1947 |
| 2,512,259 | Pike | June 20, 1950 |
| 2,548,002 | Daniels | Apr. 10, 1951 |

FOREIGN PATENTS

| Number | Country | Date |
|---|---|---|
| 18,475 of 1910 | Great Britain | Aug. 4, 1910 |